(12) United States Patent
Prasad et al.

(10) Patent No.: US 11,383,607 B1
(45) Date of Patent: Jul. 12, 2022

(54) BI-DIRECTIONAL ELECTRICAL CHARGING SYSTEM FOR A MOTOR VEHICLE

(71) Applicant: GM Global Technology Operations LLC, Detroit, MI (US)

(72) Inventors: Rashmi Prasad, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/208,138

(22) Filed: Mar. 22, 2021

(51) Int. Cl.
| | |
|---|---|
| *B60L 53/24* | (2019.01) |
| *H02M 7/5387* | (2007.01) |
| *H02M 3/158* | (2006.01) |
| *H02P 27/08* | (2006.01) |
| *B60L 53/60* | (2019.01) |

(52) U.S. Cl.
CPC ............... *B60L 53/24* (2019.02); *B60L 53/60* (2019.02); *H02M 3/1582* (2013.01); *H02M 7/53871* (2013.01); *H02P 27/08* (2013.01); *B60L 2210/12* (2013.01); *B60L 2210/14* (2013.01); *H02P 2201/07* (2013.01)

(58) Field of Classification Search
CPC ...... B60L 53/24; B60L 53/60; B60L 2210/12; H02M 3/1582; H02M 3/158; H02M 7/5387; H02M 7/53871; H02P 27/08; H02P 2210/07
See application file for complete search history.

(56) References Cited

U.S. PATENT DOCUMENTS

| | | |
|---|---|---|
| 6,909,201 B2 | 6/2005 | Murty et al. |
| 7,919,949 B2 | 4/2011 | Namuduri et al. |
| 8,432,126 B2 | 4/2013 | Hasan et al. |
| 8,606,447 B2 | 12/2013 | Namuduri et al. |
| 9,118,210 B2 | 8/2015 | Namuduri et al. |
| 9,153,974 B2 | 10/2015 | Reynolds et al. |
| 9,387,766 B2 | 7/2016 | Hao et al. |
| 9,452,672 B2 | 9/2016 | Namuduri et al. |
| 9,573,454 B2 | 2/2017 | Holmes et al. |
| 9,621,099 B1 | 4/2017 | Namuduri et al. |
| 9,657,705 B2 | 5/2017 | Holmes et al. |
| 9,868,410 B2 | 1/2018 | Namuduri et al. |
| 9,882,521 B2 | 1/2018 | Namuduri et al. |
| 9,973,028 B2 | 5/2018 | Namuduri et al. |
| 10,189,470 B2 | 1/2019 | Atluri et al. |
| 10,259,448 B2 | 4/2019 | Bucknor et al. |
| 10,432,130 B2 | 10/2019 | Namuduri et al. |
| 10,605,217 B2 | 3/2020 | Namuduri et al. |

(Continued)

*Primary Examiner* — Robert L Deberadinis
(74) *Attorney, Agent, or Firm* — Vivacqua Crane, PLLC

(57) ABSTRACT

A bi-directional electrical charging system for a motor vehicle includes a rechargeable energy storage system (RESS) configured to store a first voltage. The RESS is adapted for use with an off-board power source that is configured to store a second voltage. The system further includes an electric motor having a plurality of machine windings. The system further includes a power inverter disposed between the RESS and the off-board power source. The system is movable to a forward buck mode, a reverse buck mode, a forward boost mode, and a reverse boost mode for selectively delivering electrical power from one of the RESS and the off-board power source to the other of the RESS and the off-board power source, in response to the power inverter cycling between at least two of the ON state, the RESS OFF state, and the external OFF state.

20 Claims, 11 Drawing Sheets

(56) References Cited

U.S. PATENT DOCUMENTS

| | | |
|---|---|---|
| 2008/0173017 A1 | 7/2008 | St. James |
| 2014/0239876 A1 | 8/2014 | Hao et al. |
| 2016/0185225 A1 | 6/2016 | Namuduri et al. |
| 2018/0050686 A1 | 2/2018 | Atluri et al. |
| 2019/0160953 A1 | 5/2019 | Namuduri et al. |

US 11,383,607 B1

BI-DIRECTIONAL ELECTRICAL CHARGING SYSTEM FOR A MOTOR VEHICLE

INTRODUCTION

The present disclosure relates to vehicle electrical systems, and more particularly to a bi-directional vehicle-to-vehicle charging system for a motor vehicle for stepping up voltage or stepping down voltage to selectively charge an onboard rechargeable direct current (DC) battery pack or an off-board power source.

Propulsion systems for battery electric vehicles (BEVs) typically include one or more high-voltage polyphase electric machines in the form of a motor generator unit or an electric traction motor. These electric machines deliver power to or draw power from a rechargeable energy storage system (RESS) via a power inverter. The power inverter includes semiconductor switches that are controlled via pulse-width modulation or other switching control signals to convert the battery output voltage to an alternating current (AC) output voltage. The AC output voltage from the power inverter module is ultimately transmitted to the individual phase windings of the electric machine. The energized electric machine powers the drivetrain of the vehicle. The energized electric machines adjust torques of the various gear sets of the transmission to achieve optimal system efficiency.

BEVs further include a separate DC/DC buck converter for stepping down voltage from the battery pack to support a lower-voltage accessory load. In addition, because the battery pack of modern BEVs can be rated for voltages that are higher than the available voltage of legacy DC charging stations, the vehicles can further include a separate DC/DC boost converter for stepping up a voltage of the off-board power sources that charge the battery pack. The buck converter and the boost converter increase the cost, mass, and volume of the vehicle.

Thus, while existing vehicle electrical systems include DC/DC boost converters and DC/DC buck converters to achieve their intended purposes, there is a need for a new and improved vehicle charging system that addresses these issues.

SUMMARY

According to several aspects of the present disclosure, a bi-directional electrical charging system for a motor vehicle includes a rechargeable energy storage system (RESS) configured to store a first voltage, and the RESS is adapted for use with an off-board power source that is configured to store a second voltage. The system further includes an electric motor having a plurality of machine windings. The system further includes a power inverter disposed between the RESS and the off-board power source. The power inverter is movable to an ON state where the power inverter connects the RESS and the off-board power source to at least one of the machine windings. The power inverter is further movable to a RESS OFF state where the power inverter disconnects the RESS from each of the machine windings and connects the off-board power source to at least one of the machine windings. The power inverter is further movable to an external OFF state where the power inverter connects the RESS to at least one of the machine windings and disconnects the off-board power source from each of the machine windings. The system is movable to a forward buck mode, a reverse buck mode, a forward boost mode, and a reverse boost mode for selectively delivering electrical power from one of the RESS and the off-board power source to the other of the RESS and the off-board power source, in response to the power inverter cycling between at least two of the ON state, the RESS OFF state, and the external OFF state.

In one aspect, the power inverter includes a plurality of phase legs, with each of the phase legs connected to a corresponding one of the machine windings of the electric motor. Each phase leg includes first and second semiconductor switches that are movable between open and closed positions. The power inverter further includes an inter-leg switch separate from the first and second semiconductor switches and disposed between two of the phase legs. The inter-leg switch is movable between open and closed positions for isolating the phase legs from one another when the inter-leg switch is moved to the open position.

In another aspect, the phase legs include first and second phase legs. The first phase leg includes a positive terminal connected to a positive terminal of the RESS, and the second phase leg includes a positive terminal connected to a positive terminal of the off-board power source.

In another aspect, the system is disposed in the forward buck mode, where the power inverter cycles between the ON state and the RESS OFF state for stepping down the first voltage from the RESS to the second voltage for charging the off-board power source. The system is disposed in the forward buck mode, in response to: the inter-leg switch being moved to the open position; the first and second semiconductor switches of the first phase leg being subjected to a pulse width modulation; the first semiconductor switch of the second phase leg being moved to the closed position; and the second semiconductor switch of the second phase leg being moved to the open position.

In another aspect, the system is disposed in the reverse buck mode, where the power inverter cycles between the ON state and the external OFF state for stepping down the second voltage from the off-board power source to the first voltage for charging the RESS. The system is disposed in the reverse buck mode, in response to: the inter-leg switch being moved to the open position; the first and second semiconductor switches of the second phase leg being subjected to a pulse width modulation; the first semiconductor switch of the first phase leg being moved to the closed position; and the second semiconductor switch of the first phase leg being moved to the open position.

In another aspect, the system is disposed in the forward boost mode, where the power inverter cycles between the RESS OFF state and the ON state for stepping up the second voltage from the off-board power source to the first voltage for charging the RESS. The system is disposed in the forward boost mode, in response to: the inter-leg switch being moved to the open position; the first semiconductor switch of the second phase leg being moved to the closed position; the first and second semiconductor switches of the first phase leg being subjected to a pulse width modulation; and the second semiconductor switch of the second phase leg being moved to the open position.

In another aspect, the system is disposed in the reverse boost mode, where the power inverter cycles between the external OFF state and the ON state for stepping up the first voltage from the RESS to the second voltage for charging the off-board power source. The system is disposed in the reverse boost mode, in response to: the inter-leg switch being moved to the open position; the first semiconductor switch of the first phase leg being moved to the closed position; the first and second semiconductor switches of the second phase leg being subjected to a pulse width modulation; and the second semiconductor switch of the first phase leg being moved to the open position.

In another aspect, the system further includes an external switch disposed between the power inverter and the off-board power source. The external switch is movable between a closed position where the off-board power source is connected to the power inverter and an open position where the off-board power source is disconnected from the power inverter. The system further includes an inductor connected in series between the plurality of machine windings and the off-board power source, with the inductor being configured to mitigate at least one of current ripple or torque ripple.

According to several aspects of the present disclosure, a bi-directional electrical charging system for a motor vehicle includes a rechargeable energy storage system (RESS) configured to store a first voltage, and the RESS is adapted for use with an off-board power source that is configured to store a second voltage. The system further includes an electric motor having a plurality of machine windings. The system further includes a power inverter disposed between the RESS and the off-board power source. The power inverter is movable to an ON state where the power inverter connects the RESS and the off-board power source to at least one of the machine windings. The power inverter is further movable to a RESS OFF state where the power inverter disconnects the RESS from each of the machine windings and connects the off-board power source to at least one of the machine windings. The power inverter is further movable to an external OFF state where the power inverter connects the RESS to at least one of the machine windings and disconnects the off-board power source from each of the machine windings. The system further includes a controller connected to the power inverter and configured to generate a plurality of control signals. The power inverter cycles between at least two of the ON state, the RESS OFF state, and the external OFF state, in response to the power inverter receiving the control signals from the controller. The system is movable to a forward buck mode, a reverse buck mode, a forward boost mode, and a reverse boost mode for selectively delivering electrical power from one of the RESS and the off-board power source to the other of the RESS and the off-board power source, in response to the power inverter cycling between at least two of the ON state, the RESS OFF state, and the external OFF state.

In one aspect, the power inverter includes an inverter controller for generating a plurality of switch signals, in response to the inverter controller receiving the control signals from the controller. The power inverter further includes first and second phase legs, with each of the first and second phase legs connected to a corresponding one of the machine windings of the electric motor. Each of the first and second phase legs includes first and second semiconductor switches movable between open and closed positions, in response to the first and second semiconductor switches receiving the switch signals from the inverter controller. The power inverter further includes an inter-leg switch separate from the first and second semiconductor switches and disposed between the first and second phase legs. The inter-leg switch is movable between open and closed positions for isolating the first and second phase legs from one another when the inter-leg switch is moved to the open position. The first phase leg includes a positive terminal connected to a positive terminal of the RESS, and the second phase leg includes a positive terminal connected to a positive terminal of the off-board power source.

In another aspect, the system is disposed in the forward buck mode, where the power inverter cycles between the ON state and the RESS OFF state for stepping down the first voltage from the RESS to the second voltage for charging the off-board power source. The system is disposed in the forward buck mode, in response to: the inter-leg switch being moved to the open position; the first and second semiconductor switches of the first phase leg being subjected to a pulse width modulation; the first semiconductor switch of the second phase leg being moved to the closed position; and the second semiconductor switch of the second phase leg being moved to the open position.

In another aspect, the system is disposed in the reverse buck mode, where the power inverter cycles between the ON state and the external OFF state for stepping down the second voltage from the off-board power source to the first voltage for charging the RESS. The system is disposed in the reverse buck mode, in response to: the inter-leg switch being moved to the open position; the first and second semiconductor switches of the second phase leg being subjected to a pulse width modulation; the first semiconductor switch of the first phase leg being moved to the closed position; and the second semiconductor switch of the first phase leg being moved to the open position.

In another aspect, the system is disposed in the forward boost mode, where the power inverter cycles between the RESS OFF state and the ON state for stepping up the second voltage from the off-board power source to the first voltage for charging the RESS. The system is disposed in the reverse buck mode, in response to: the inter-leg switch being moved to the open position; the first semiconductor switch of the second phase leg being moved to the closed position; the first and second semiconductor switches of the first phase leg being subjected to the pulse width modulation; and the second semiconductor switch of the second phase leg being moved to the open position.

In another aspect, the system is disposed in the reverse boost mode, where the power inverter cycles between the external OFF state and the ON state for stepping up the first voltage from the RESS to the second voltage for charging the off-board power source. The system is disposed in the reverse buck mode, in response to: the inter-leg switch being moved to the open position; the first semiconductor switch of the first phase leg being moved to the closed position; the first and second semiconductor switches of the second phase leg being subjected to a pulse width modulation; and the second semiconductor switch of the first phase leg being moved to the open position.

According to several aspects of the present disclosure, a method of operating a bi-directional electrical charging system for a motor vehicle is provided. The system includes a rechargeable energy storage system (RESS) for storing a first voltage and adapted for use with an off-board power source for storing a second voltage. The system further includes an electric motor having a plurality of machine windings. The system further includes a power inverter having first and second phase legs, with each of the first and second phase legs having first and second semiconductor switches. The system further includes a controller and an inter-leg switch disposed between the first and second phase legs. The method includes the controller determining that a selection of one a forward buck mode, a reverse boost mode, a forward boost mode, or a reverse buck mode has been received. The controller generates a plurality of control signals, in response to the selection of the forward buck mode, the reverse boost mode, the forward boost mode, or the reverse buck mode. An inverter controller generates a plurality of switch signals, in response to the inverter controller receiving the control signals from the controller. The first and second semiconductor switches cycle the power inverter between at least two of an ON state, a RESS OFF state, and an external OFF state, in response to the first and second semiconductor switches receiving the switch signals from the inverter controller. In the ON state, the power inverter connects the RESS and the off-board power source to at least one of the machine windings. In the RESS OFF state, the power inverter disconnects the RESS from each of the machine windings and connects the off-board power source to at least one of the machine windings. In the external OFF state, the power inverter connects the RESS to at least one of the machine windings and disconnects the off-board power source from each of the machine windings. The inter-leg switch moves to an open position, in response to the inter-leg switch receiving one of the switch signals from the inverter controller. The system moves between the forward buck mode, the reverse buck mode, the forward boost mode, and the reverse boost mode for selectively delivering one of a stepped up voltage and a stepped down voltage from one of the RESS and the off-board power source to the other of the RESS and the off-board power source, in response to the power inverter cycling between at least two of the ON state, the RESS state, and the external OFF state.

In one aspect, the controller determines the selection of the forward buck mode where the first voltage of the RESS is above the second voltage of the off-board power source. The power inverter cycles between the ON state and the RESS OFF state, such that current flows through at least one of the machine windings for stepping down the first voltage from the RESS to the second voltage for charging the off-board power source. Cycling the power inverter between the ON state and the RESS OFF state includes: the inter-leg switch moving to the open position; the first and second semiconductor switches of the first phase leg being subjected to a pulse width modulation, where the first second phase leg includes a positive terminal connected to a positive terminal of the RESS, and the second phase leg includes a positive terminal connected to a positive terminal of the off-board power source; the first semiconductor switch of the second phase leg moving to the closed position; and the second semiconductor switch of the second phase leg moving to the open position.

In another aspect, the controller determines the selection of the reverse buck mode where the second voltage of the off-board power source is above the first voltage of the RESS. The power inverter cycles between the ON state and the external OFF state, such that current flows through at least one of the machine windings to step down the second voltage from the off-board power source to the first voltage for charging the RESS. Cycling the power inverter between the ON state and the external OFF state includes: the inter-leg switch moving to the open position; the first and second semiconductor switches of the second phase leg being subjected to the pulse width modulation; the first semiconductor switch of the first phase leg moving to the closed position; and the second semiconductor switch of the first phase leg moving to the open position.

In another aspect, the controller determines the selection of the forward boost mode where the first voltage of the RESS is above the second voltage of the off-board power source. The power inverter cycles between the RESS OFF state and the ON state, such that current flows through at least one of the machine windings for stepping up the second voltage from the off-board power source to the first voltage for charging the RESS. Cycling the power inverter between the RESS OFF state and the ON state includes: the inter-leg switch moving to the open position; the first semiconductor switch of the second phase leg moving to the closed position; the first and second semiconductor switches of the first phase leg being subjected to the pulse width modulation; and the second semiconductor switch of the second phase leg moving to the open position.

In another aspect, the controller determines the selection of the reverse boost mode where the second voltage of the off-board power source is above the first voltage of the RESS. The power inverter cycles between the external OFF state and the ON state, such that current flows through at least one of the machine windings for stepping up the first voltage from the RESS to the second voltage for charging the off-board power source. Cycling the power inverter between the external OFF state and the ON state includes: the inter-leg switch moving to the open position; the first semiconductor switch of the first phase leg moving to the closed position; the first and second semiconductor switches of the second phase leg being subjected to the width modulation; and the second semiconductor switch of the first phase leg moving to the open position.

In another aspect, the controller receives a software update via an over-the-air programming, with the software update being associated with the control signals generated by the controller.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes a bi-directional electrical charging system for a motor vehicle that can use an onboard rechargeable electrical storage system (RESS), a power inverter, and an electric motor to achieve a desired voltage from one of the RESS and an off-board power source for charging the other of the RESS and an off-board power source, without using a dedicated DC/DC converter. As described in detail below, the electric motor includes machine windings, and the power inverter includes inverter switches, which are actuated by a controller for stepping up voltage or stepping down voltage for charging the RESS or the off-board power source.

Figure 1:
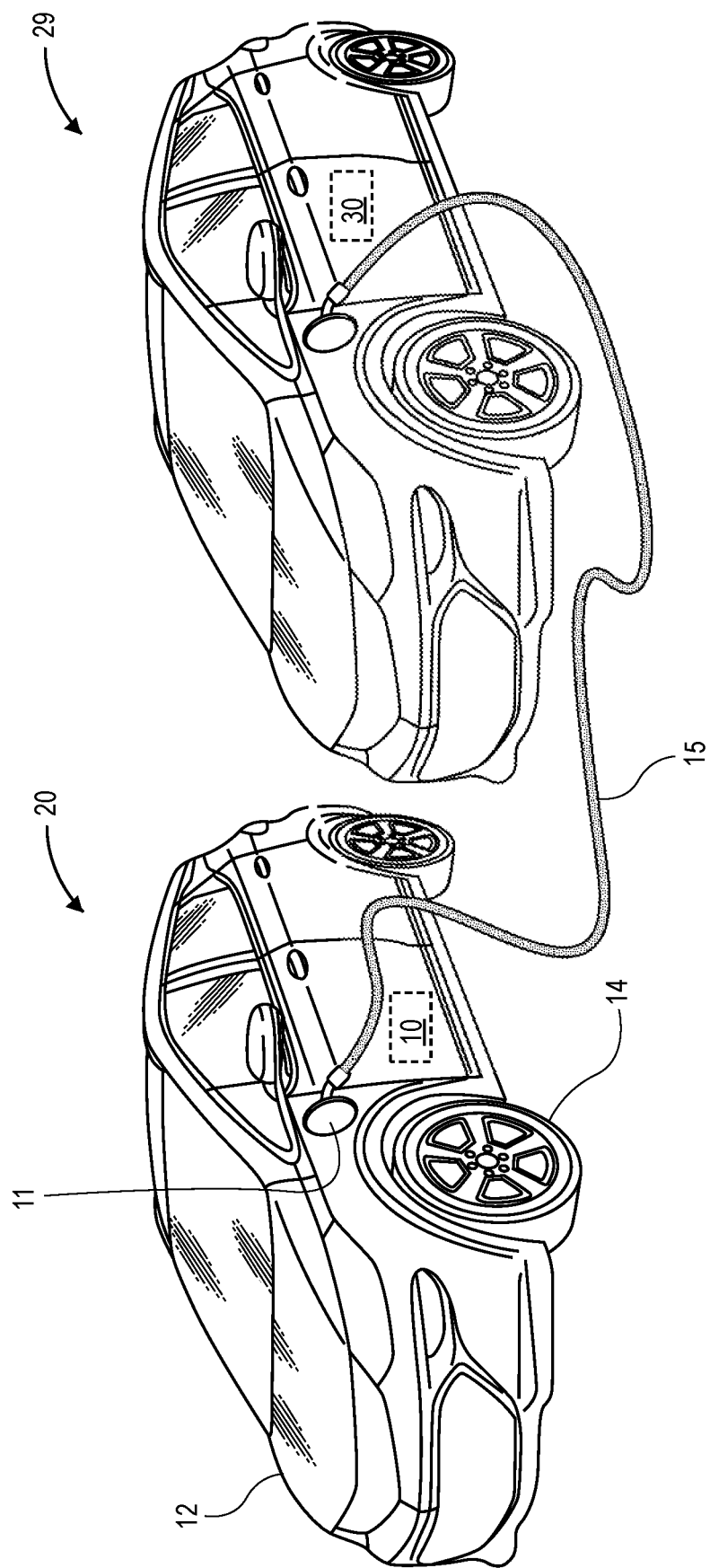
FIG. 1 is a perspective view of one example of a motor vehicle having a bi-directional electrical charging system (system) with a rechargeable energy storage system (RESS) adapted for use with an off-board power source.

Referring to FIG. 1, one example of a bi-directional electrical charging system 10 (system) is integrated within a propulsion system for the first motor vehicle 20. The system 10 is a direct current (DC) charging circuit, and the first motor vehicle 20 is depicted as undergoing a DC fast-charging operation in which the DC charging circuit 10 includes a RESS 115 (FIG. 2) configured to store a first voltage. The DC charging circuit 10 further includes a charging port 11 electrically connectable to an off-board power source 30 via a charging cable 15. In this example, as described in more detail below, the off-board power source 30 is a RESS of a second motor vehicle 29 and configured to store a second voltage. The charging cable 15 can use an SAE J1772 charge connector, CHAdeMO, or another suitable regional or national standard charging plug or connector.

The present teachings are independent of the particular charging standard that is ultimately employed in the system 10, and thus the examples herein are merely illustrative. For illustrative consistency, an application of the DC charging circuit 10 as an integral part of the first motor vehicle 20 in the first motor vehicle 20 and connectable to the off-board power source 30 of the second vehicle 29 will be described hereinafter without limiting the present disclosure to such an implementation. It is contemplated that the electrical system can be used as part of any suitable stationary or mobile vehicle, power plant, robot, or platform. For other vehicular applications, the DC charging circuit can be used as part of an aircraft, a marine vessel, a rail vehicle, or other suitable vehicle. In other examples, the off-board power source can be a DC fast-charging station that remains in one location.

The first motor vehicle 20 includes a body 12 and drive wheels 14. The body 12 may define or include the charging port 11 at a user-accessible location. The first motor vehicle 20 may be variously embodied as a plug-in electric vehicle having the RESS 115 (FIG. 2) and described below, e.g., a multi-cell lithium ion, zinc-air, nickel-metal hydride, or lead acid direct current battery pack that can be selectively recharged using the off-board power source 30 of the second vehicle 29. The DC charging circuit 10, as best depicted in FIG. 2, incorporates propulsion/traction drive components of the first motor vehicle 20 whose ordinary functions may include powering an electric motor 114, e.g., a traction motor, to generate and deliver motor torque to the drive wheels 14 for propulsion of the first motor vehicle 20, or for performing other useful work aboard the first motor vehicle 20.

Figure 2:
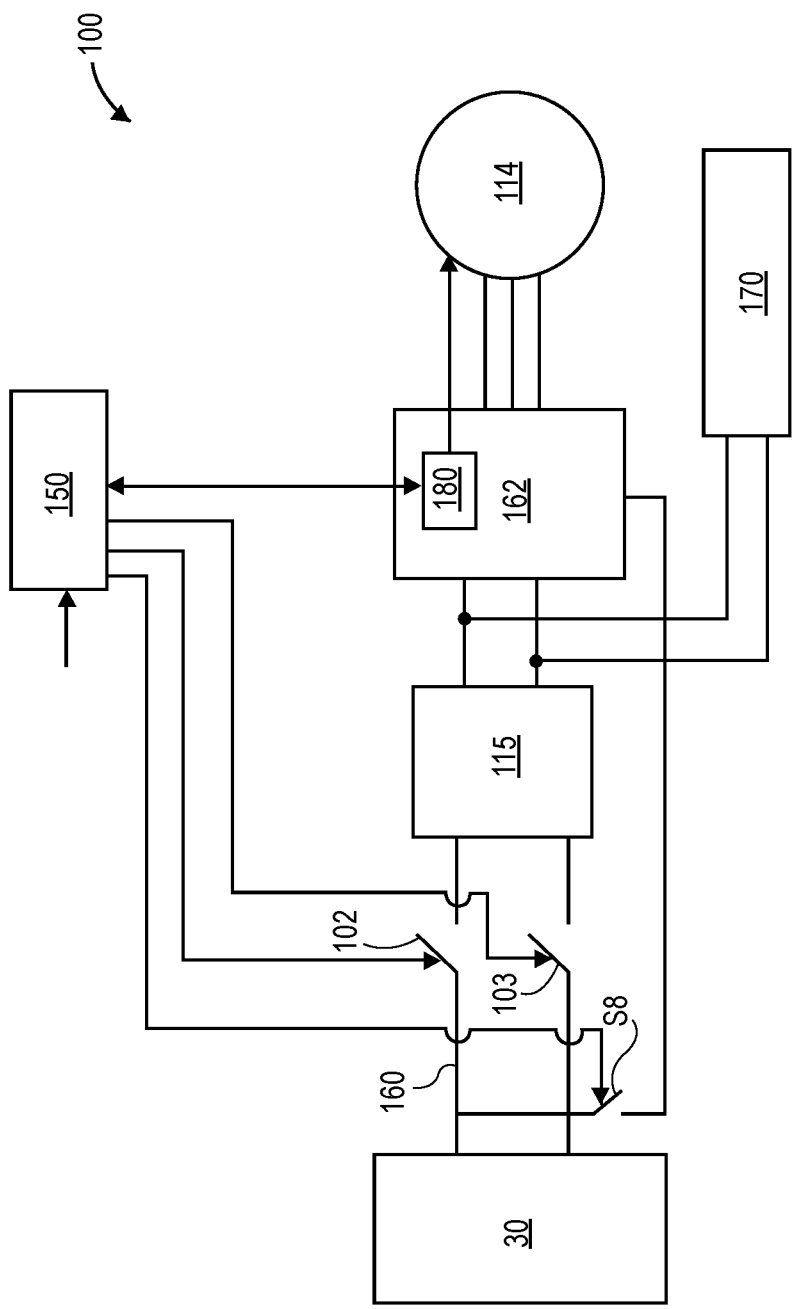
FIG. 2 is a block diagram of the system of FIG. 1, illustrating the system having a power inverter, an electric motor, and a controller for stepping up or stepping down voltage delivered between the RESS and the off-board power source.

Referring to FIG. 2, the system 100 further includes a first switch 102, which is disposed between the positive terminal of the off-board power source 30 and the positive terminal of the RESS 115, and a second switch 103, which is disposed between the negative terminal of the off-board power source 30 and the negative terminal of the RESS 115. When the off-board power source 30 and the RESS 115 are rated for a common voltage, the first and second switches 102, 103 can be closed such that one of the off-board power source 30 and the RESS 115 can directly charge the other of the off-board power source 30 and the RESS 115. The first and second switches 102, 103 may be contactors or solid-state relays that are adapted to close under electrical load so as to ensure the instantaneous or near instantaneous delivery of electrical charge between the off-board power source 30 and the RESS 115. The system 100 further includes a switch S8 disposed between the off-board power source 30 and the power inverter 162 and movable between an open position and a closed position. The switch S8 is closed and the power inverter 162 is operated, as described in detail below, for allowing current to flow through the power inverter 162 and the electric motor 114 for stepping up or stepping down voltage.

The RESS 115 is configured for storing a first voltage used for propelling an electric-drive vehicle, such as the first motor vehicle 20 (FIG. 1). In one example, the RESS 115 may be a deep-cycle, high-ampere capacity battery system rated for approximately four hundred (400) to approximately eight hundred (800) volts direct current (VDC). In other examples, the RESS can be rated for voltage values below four hundred (400) VDC or above eight hundred (800) VDC depending on, for example, a desired vehicle range, gross vehicle weight, and power ratings of the various loads drawing electrical power from the RESS 115. As shown in FIGS. 3A-6B, a DC link capacitor Ci can be connected across positive and negative terminals.

The RESS 115 may include one or more high-voltage, independently-rechargeable battery packs that are electrically connectable to one or more polyphase electric machines, such as three-phase traction motor 114. More specifically, the RESS 115 may be connected to a high-voltage DC bus bar and a power inverter 162 for governing the transmission of electrical energy to and from the electric motor 114.

As shown in FIGS. 3A-6B, the power inverter 162 is disposed between the RESS 115 and the off-board power source 30. The power inverter 162 is movable to an ON state (FIGS. 3A, 4A, 5B, and 6B) where the power inverter 162 connects the RESS 115 and the off-board power source 30 to at least one of the machine windings 166. The power inverter 162 is further movable to a RESS OFF state (FIGS. 3B and 5A) where the power inverter 162 disconnects the RESS 115 from each of the machine windings 166 and connects the off-board power source 30 to at least one of the machine windings 166. The power inverter 162 is further movable to an external OFF state (FIGS. 4B and 6A) where the power inverter 162 connects the RESS 115 to at least one of the machine windings 166 and disconnects the off-board power source 30 from each of the machine windings 166.

The power inverter 162 can be a DC-to-AC and AC-to-DC power inverter, which may be part of a traction power inverter module (TPIM). The power inverter 162 is disposed between the RESS 115 and a plurality of machine windings 166 of the electric motor 114 to transmit electrical energy between the electric motor 114 and the RESS 115. The machine windings 166 are illustrated as machine windings La, Lb, and Lc, and can be provided with three-phase current to create a rotating magnetic field to rotate a rotor (not shown) of the electric motor 114. The power inverter 162 may incorporate multiple power inverters and respective motor control modules operable to receive motor control commands and control inverter states therefrom for providing motor drive or regenerative functionality.

The power inverter 162 may include a set 164 of semiconductor switches S1-S6 (also referred to herein as "inverter switches"). The power inverter 162 includes a plurality of phase legs with one or more inverter switches for each phase leg. More specifically, in this example, the power inverter 162 includes a first phase leg P1 with inverter switches S1, S2, a second phase leg P2 with inverter switches S5, S6, and a third phase leg P3 with inverter switches S3, S4. The first phase leg P1 includes a positive terminal connected to a positive terminal of the RESS 115, and the second phase leg P2 includes a positive terminal connected to a positive terminal of the off-board power source. The inverter switches S1-S6 are movable between open and closed positions and cooperatively convert direct current (DC) power from the RESS 115 to alternating current (AC) power for powering the electric motor 114 via high-frequency switching in motoring mode.

Each inverter switch S1-S6 may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), other wideband-gap (WBG) or ultra-wideband-gap semiconductor power switching devices (UWBG), or other suitable switch having a corresponding gate to which a gate signal is applied to change the on/off state of a given switch. There is typically one or more pairs of semiconductor switches for each phase of the three-phase traction motor 114. Each phase leg of the power inverter 162 is connected to a corresponding machine phase terminal, e.g., one of the machine windings 166. The power inverter 162 further includes an inter-leg switch S7 separate from the inverter switches S1-S6 and movable between open and closed positions. The inter-leg switch S7 is disposed between two of the phase legs for isolating the first phase leg P1 from the other phase legs P2, P3 when the inter-leg switch S7 is moved to the open position. In another example, the inter-leg switch may be disposed between two of the phase legs for isolating the first two phase legs P1, P3 from the other phase leg P2 when the inter-leg switch is moved to the open position.

The off-board power source 30 of the second motor vehicle 29 (FIG. 1) may include one or more high-voltage, independently-rechargeable battery packs that are electrically connectable to one or more polyphase electric motors, such as a three-phase traction motor (not shown). More specifically, the off-board power source 30 may be connected to a high-voltage DC bus bar (not shown) and a power inverter (not shown) for governing the transmission of electrical energy to and from the electric motor of the second vehicle 29. While the off-board power source can be integrated within a bi-directional electrical charging system similar to the system 10, it is contemplated that the off-board power source can be integrated within known electrical systems of EVs and HEVs.

In one example, the first voltage stored by the RESS 115 of the first motor vehicle 20 is above a second voltage stored by the off-board power source 30. More specifically, the RESS 115 may be adapted to store approximately eight hundred (800) VDC, and the off-board power source may be adapted to store approximately four hundred (400) VDC. It is contemplated that the first voltage of the RESS can be above or below 800 VDC, and the second voltage of the off-board power source 30 can be above or below 400 VDC while being below the first voltage. In another example, the second voltage stored by the off-board power source 30 is above the first voltage stored by the RESS 115 of the first motor vehicle 20. The off-board power source 30 may be adapted to store approximately 800 VDC, and the RESS 115 may be adapted to store approximately 400 VDC. It is contemplated that the off-board power source can be above or below 800 VDC, and the RESS can be above or below 400 VDC while being below the second voltage of the off-board power source 30.

The system 10 further includes an external switch S8 disposed between the power inverter 162 and the off-board power source 30, and the external switch 162 is movable between a closed position where the off-board power source 30 is connected to the power inverter 162 and an open position where the off-board power source 30 is disconnected from the power inverter 162. The switches S7, S8 may be contactors that are adapted to close under electrical load so as to ensure the instantaneous or near instantaneous delivery of electrical power to between the phase legs and to the off-board power source 30. While FIGS. 3A-6B illustrate switches S7, S8, it is understood that the switches S7, S8 may be replaced with a solid-state relay in some implementations.

The system 10 may further include an inductor L1 connected in series between the plurality of machine windings 166 and the off-board power source 30, wherein the inductor L1 is configured to mitigate at least one of current ripple or torque ripple.

The system 10 further includes a controller 150, which can include a processor and sufficient memory for storing computer-readable instructions. The memory includes tangible, non-transitory memory, e.g., read only memory, whether optical, magnetic, flash, or otherwise. The controller 150 also includes sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 150 can receive charging request signals from one or more electronic control units (ECUs) of the first motor vehicle 20. For example, an ECU associated with one or more of the accessory loads (not shown) may provide a signal indicating that the accessory loads require electrical power, and the controller 150 can initiate any one of a forward buck operation, a reverse boost operation, a forward boost operation, and a reverse buck operation as discussed in greater detail below.

As shown in FIGS. 3A-6B, the power inverter 162 further includes an inverter controller 180 that generates switch signals for controlling operation of semiconductor switches S1-S6, in response to the inverter controller 162 receiving control signals from the controller 150. Similar to the controller 150, the inverter controller 180 can include the processor and sufficient memory for storing computer-readable instructions. The memory includes tangible, non-transitory memory, e.g., read only memory, whether optical, magnetic, flash, or otherwise. The inverter controller 180 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry.

In an example implementation, the inverter controller 180 can receive control signals from the controller 150 and/or from sensors within the electric motor 114. For example, the electric motor 114 can include phase current sensors and/or rotor position sensors and provide signals indicative of a phase current and/or a position of the rotor, respectively. The inverter controller 180 can control the semiconductor switches S1 through S6 by supplying a signal to one or more gates to cause the semiconductor switches S1 through S6 to transition between an open position and a closed position, as discussed in greater detail below.

Figure 5A:
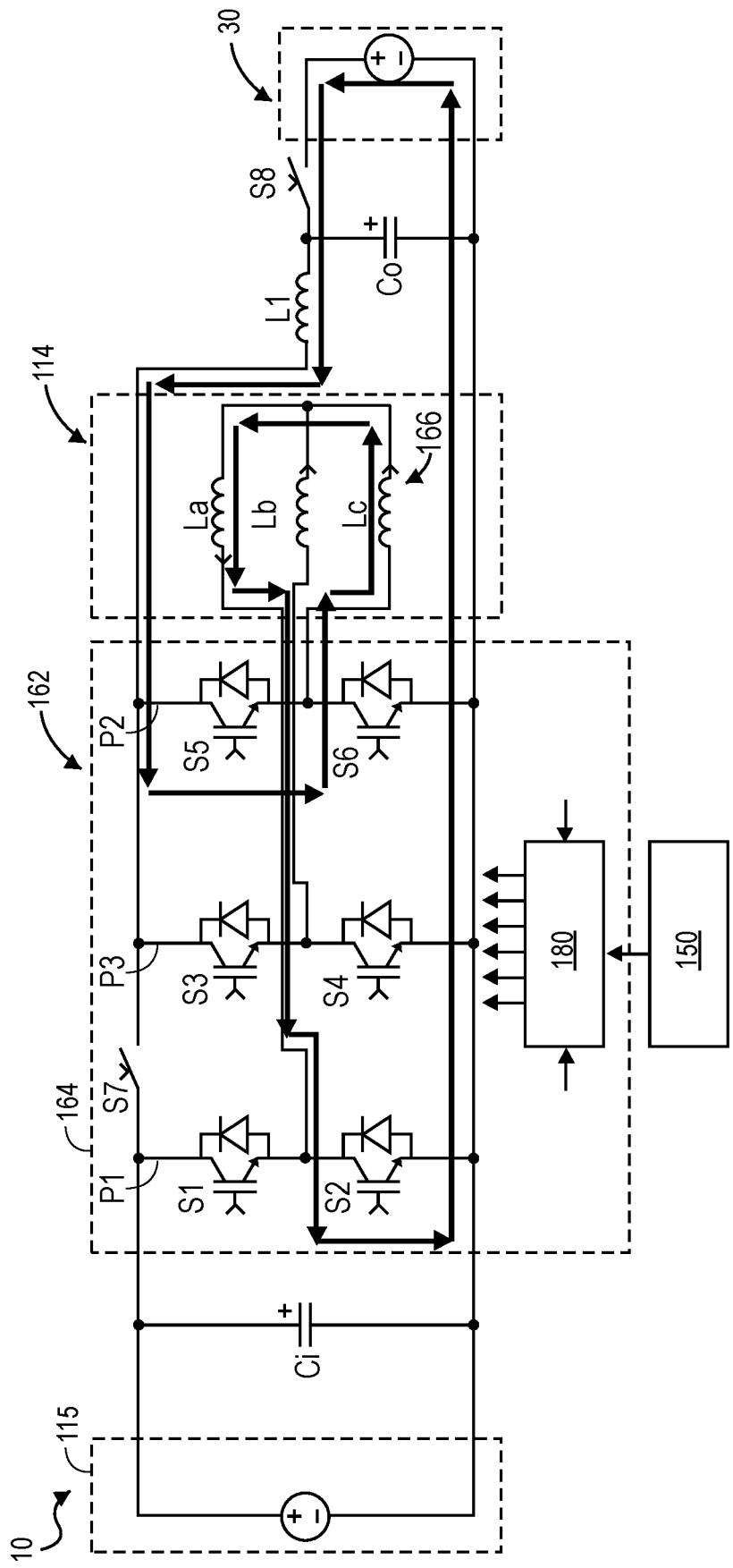
FIG. 5A is a circuit schematic of the system of FIG. 2, illustrating the power inverter in a forward boost mode with the power inverter disposed in the RESS OFF state, where the power inverter electrically disconnects the RESS from the electric motor and electrically connects the off-board power source to the electric motor.
Figure 5B:
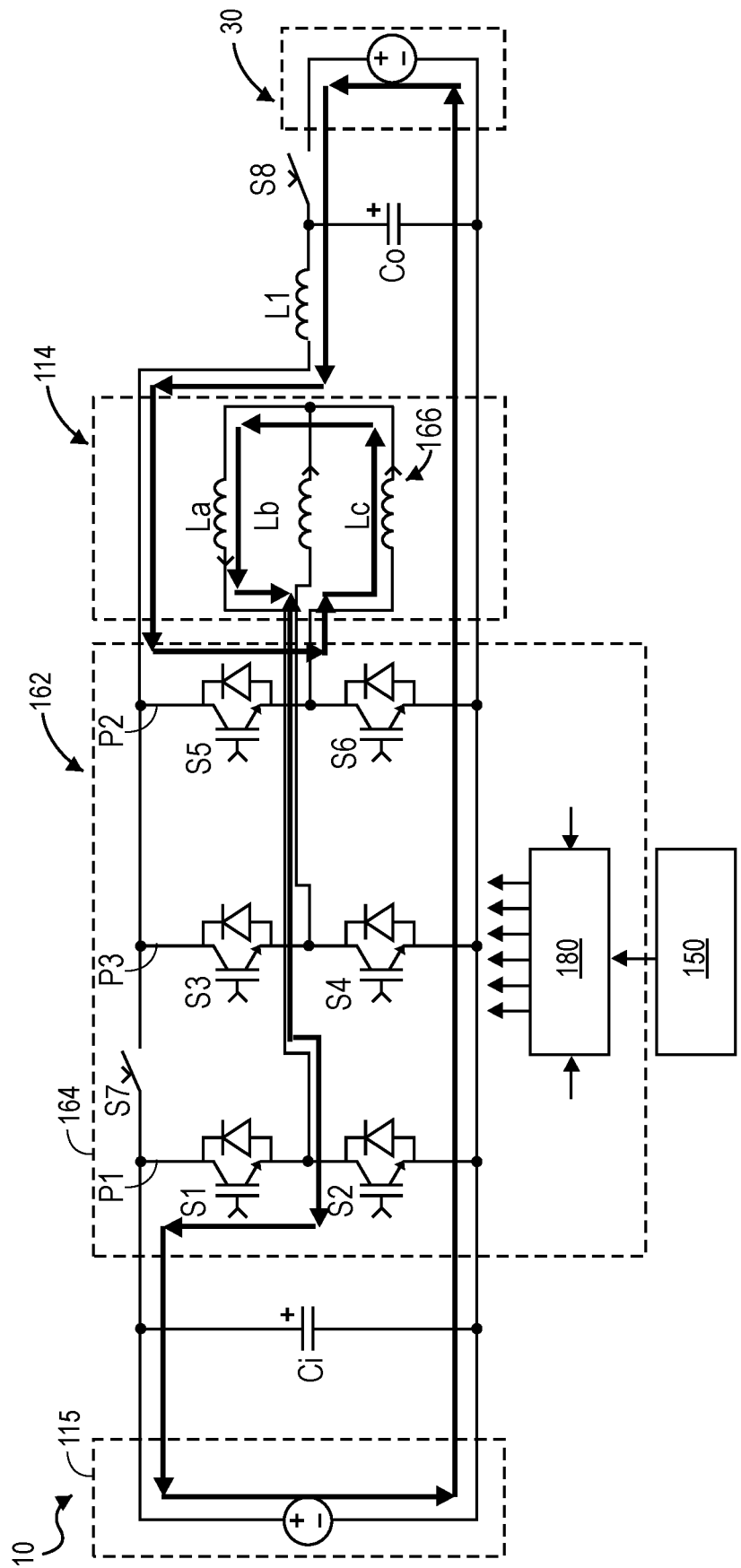
FIG. 5B is a circuit schematic of the system of FIG. 5A, illustrating the power inverter disposed in the ON state, where the power inverter electrically connects the RESS and the off-board power source to the electric motor.
Figure 6A:
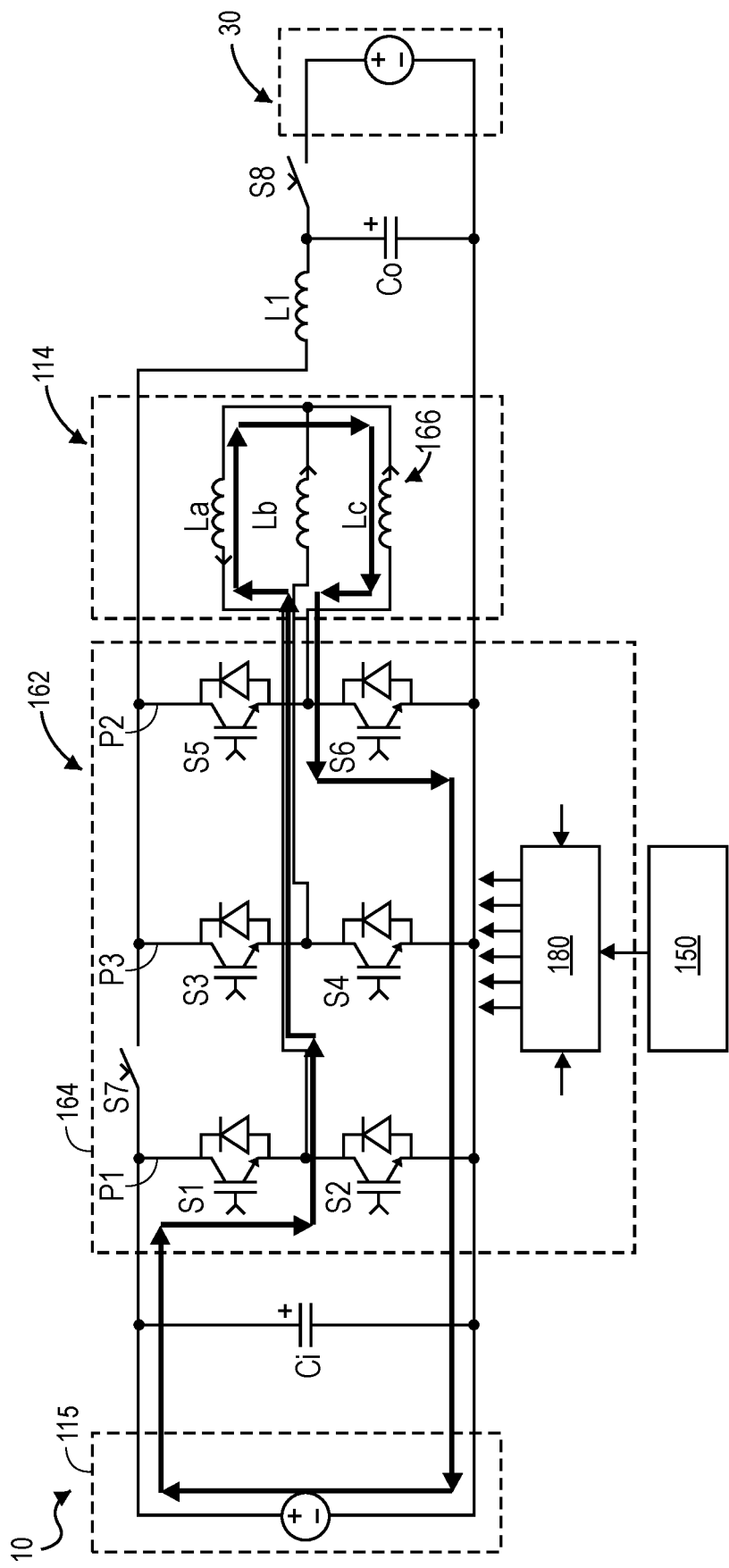
FIG. 6A is a circuit schematic of the system of FIG. 2, illustrating the system in a reverse boost mode with the power inverter disposed in the external OFF state, where the power inverter electrically disconnects the off-board power source to from the electric motor and electrically connects the RESS to the electric motor.
Figure 6B:
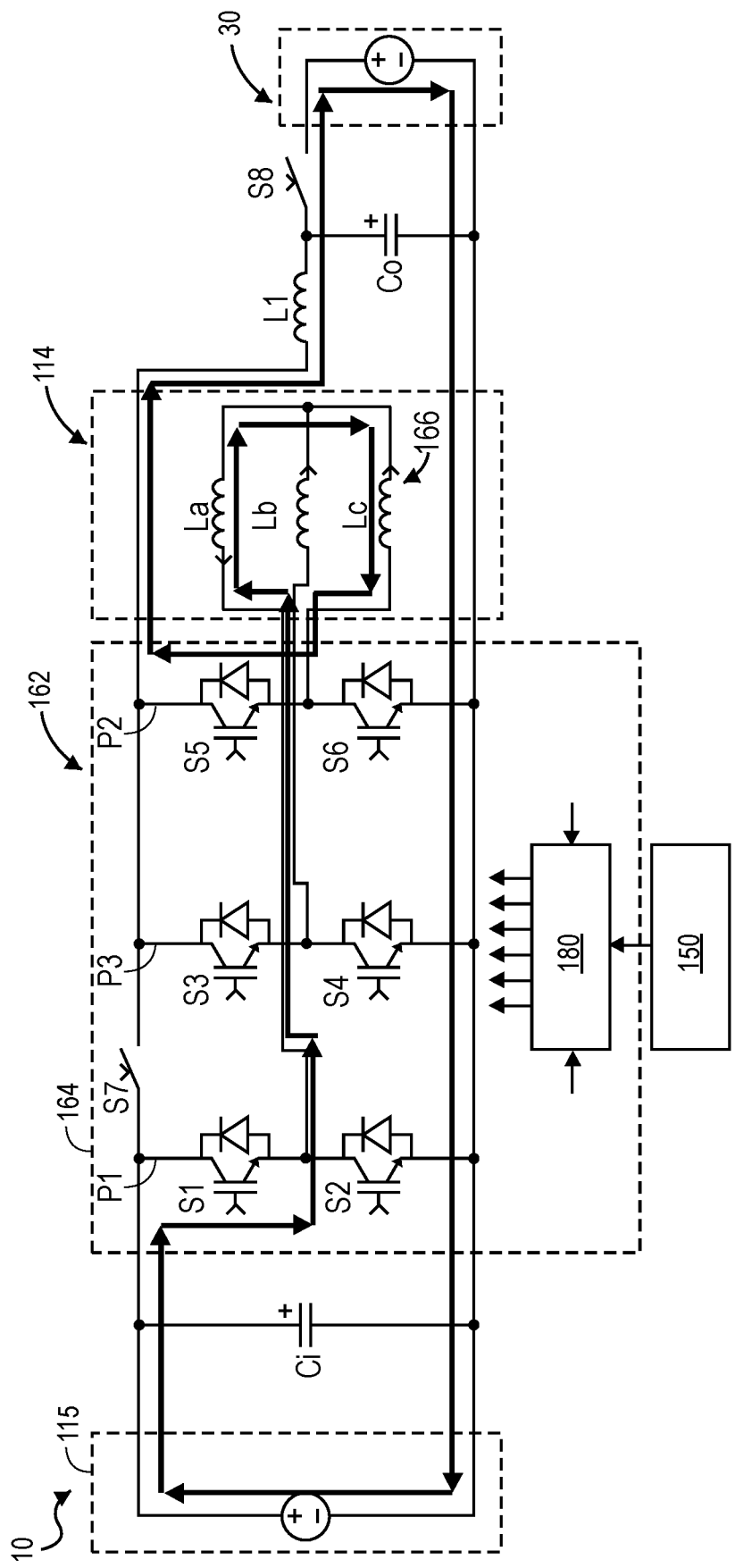
FIG. 6B is a circuit schematic of the system of FIG. 6A, illustrating the power inverter disposed in the ON state, where the power inverter electrically connects the RESS and the off-board power source to the electric motor.

The system 10 transitions between a forward buck mode (FIGS. 3A-3B), a reverse buck mode (FIGS. 4A-4B), a forward boost mode (FIGS. 5A-5B), and a reverse boost mode (FIGS. 6A-6B). As described in detail below, the system 10 transitions between these modes for delivering electrical energy from one of the RESS 115 and the off-board power source 30 to the other of the RESS 115 and the off-board power source 30, in response to the power inverter 162 transitioning between the ON state, the RESS OFF state, and the external OFF state, the switch S7 moving to the open position, and the switch S8 moving to the closed position.

Figure 3A:
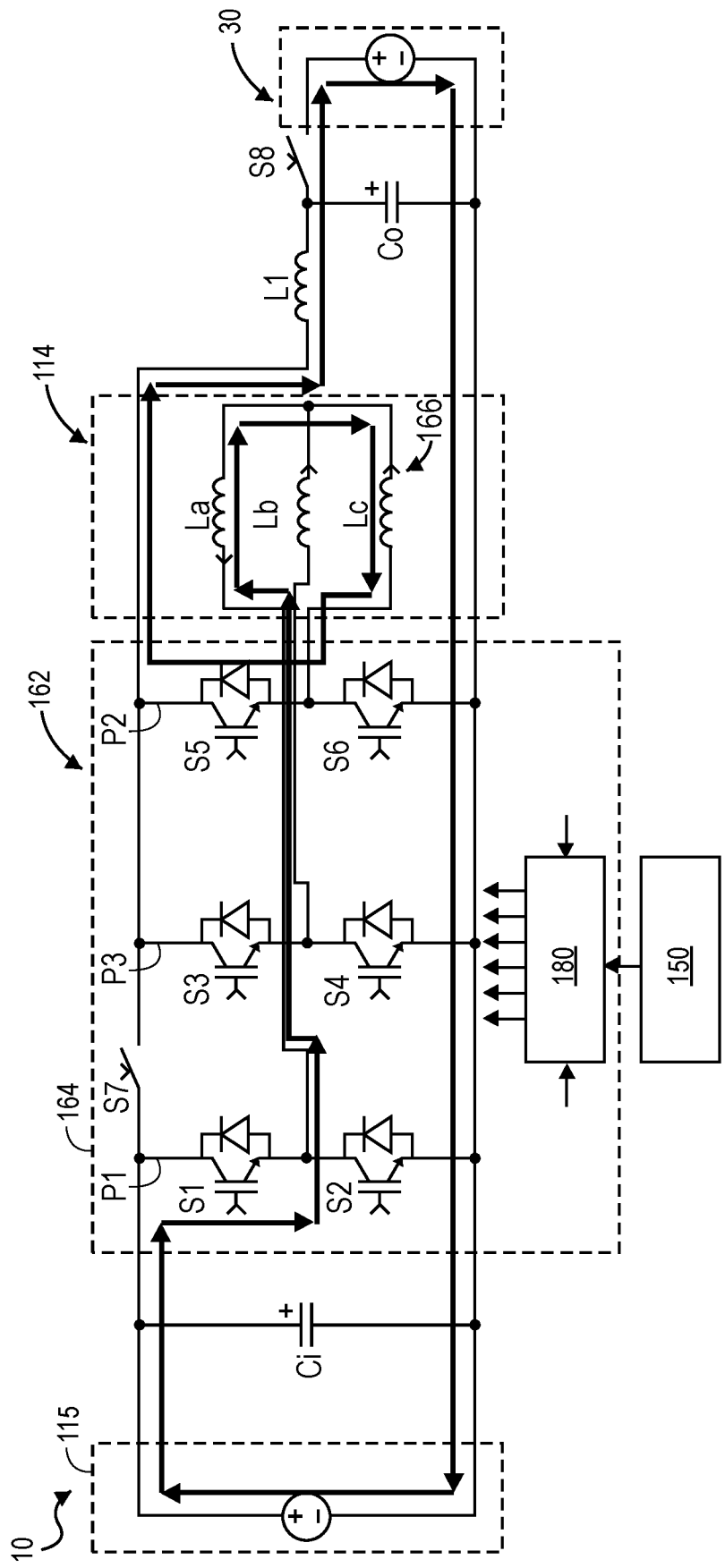
FIG. 3A is a circuit schematic of the system of FIG. 2, illustrating the system in a forward buck mode with the power inverter disposed in an ON state, where the power inverter electrically connects the RESS and the off-board power source to the electric motor.
Figure 3B:
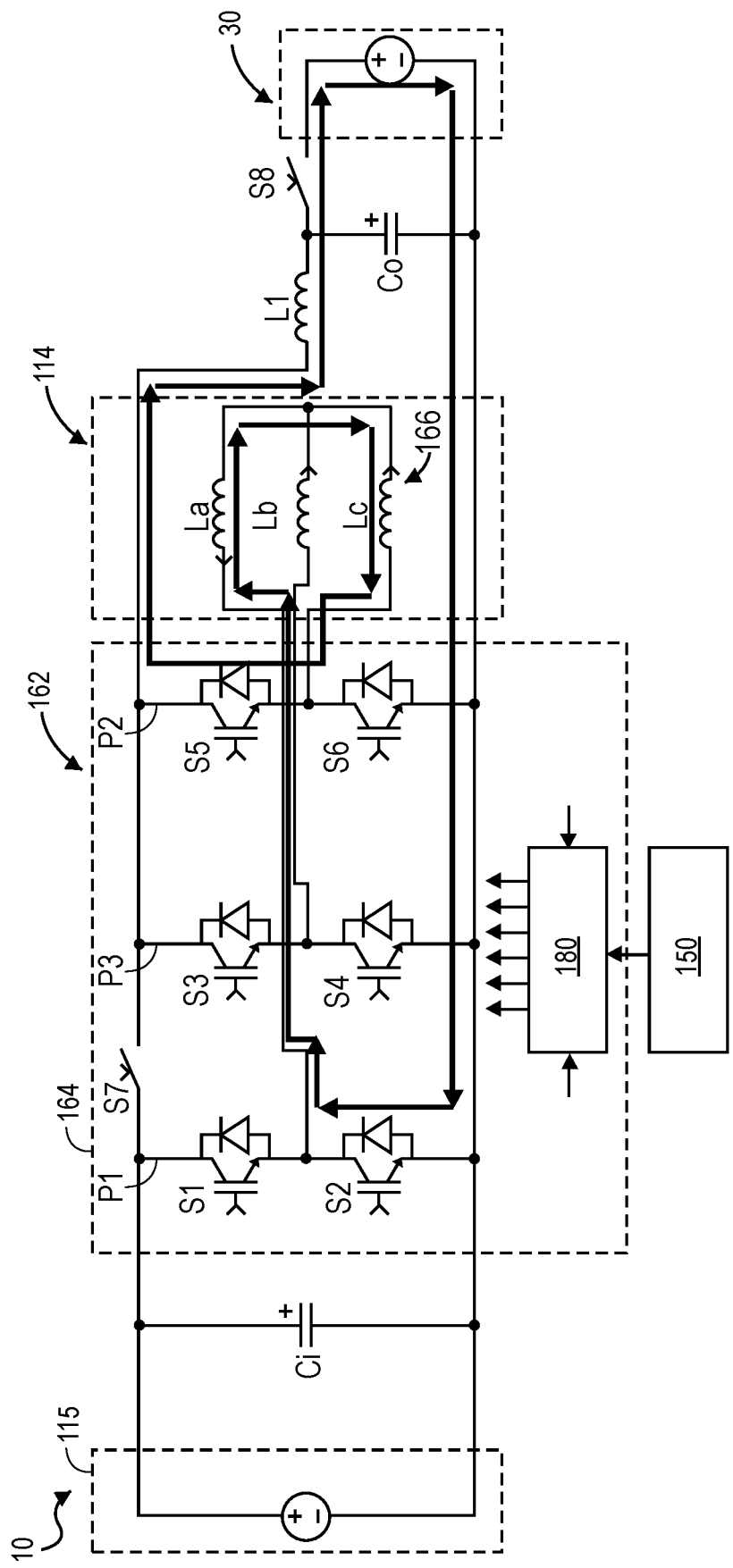
FIG. 3B is a circuit schematic of the system of FIG. 3A, illustrating the power inverter disposed in a RESS OFF state, where the power inverter electrically disconnects the RESS from the electric motor.

Referring now to FIGS. 3A and 3B, the system 10 is disposed in the forward buck mode where the RESS 115 is configured to store the first voltage that is above the second voltage of the off-board power source 30. The power inverter 162 cycles between the ON state (FIG. 3A) and the RESS OFF state (FIG. 3B) for stepping down the first voltage from the RESS 115 to the second voltage for charging the off-board power source 30, in response to: the inter-leg switch S7 being moved to the open position; the first and second semiconductor switches S1, S2 of the first phase leg P1 being subjected to a pulse width modulation; the first semiconductor switch S5 of the second phase leg P2 being moved to the closed position; the second semiconductor switch S6 of the second phase leg P2 and the first and second semiconductor switches S3, S4 of the third phase leg P3 being moved to the open position; and the external switch S8 moved to the closed position. Current flows through one or more of the machine windings La, Lc to cause a voltage from the RESS 115 to step down from the first voltage to the second voltage. The inductors La, Lc can reduce the voltage from the first voltage to the second voltage such that the machine windings 166 perform a buck conversion. Inductor L1 can be positioned in series with the machine windings 166 to reduce, e.g., mitigate, current ripple and torque disturbance. In this example, the duty cycle of S1 for the pulse width modulation may be approximately the ratio of the voltage of 30 to that of the RESS 115.

Figure 4A:
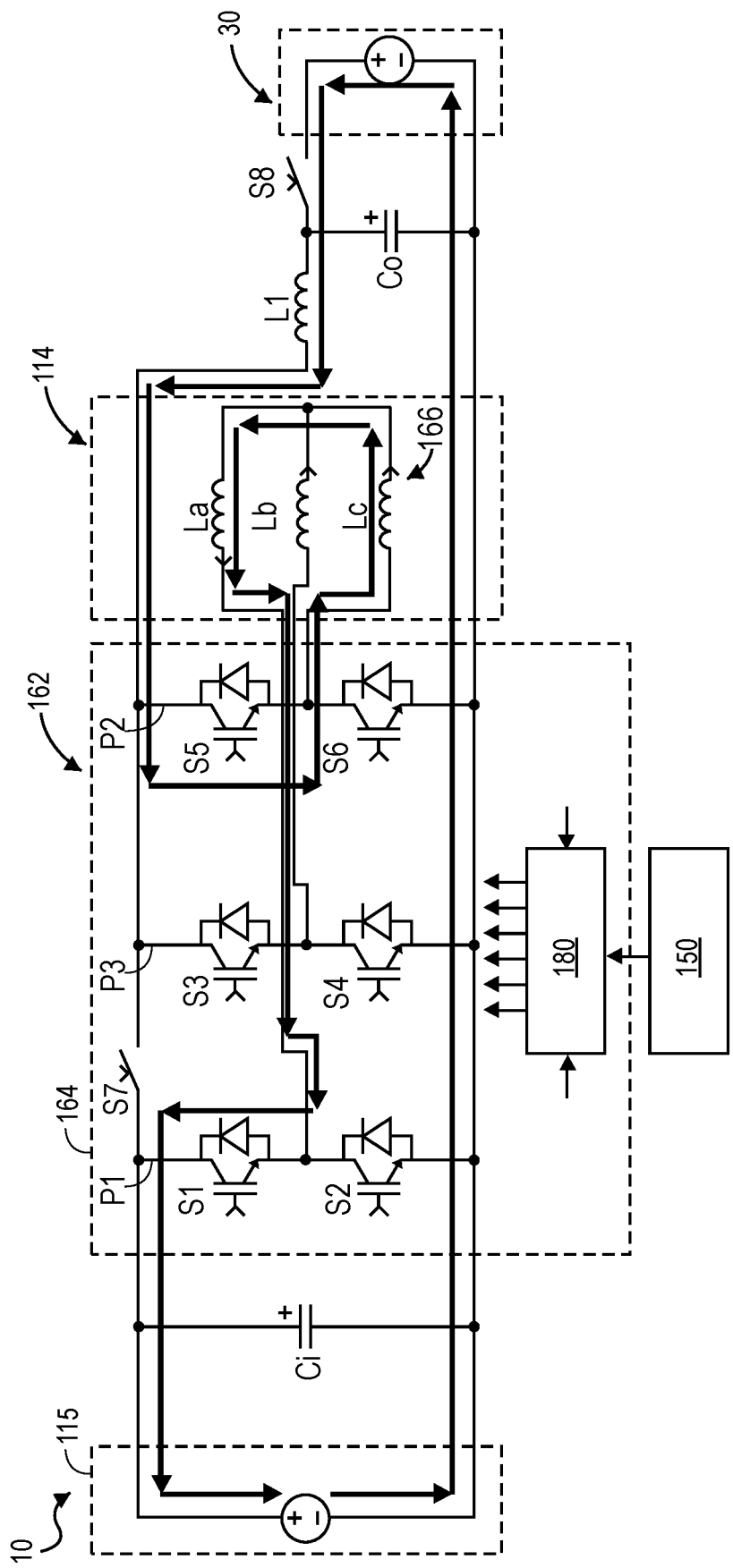
FIG. 4A is a circuit schematic of the system of FIG. 2, illustrating the system in a reverse buck mode with the power inverter disposed in the ON state, where the power inverter electrically connects the RESS and the off-board power source to the electric motor.
Figure 4B:
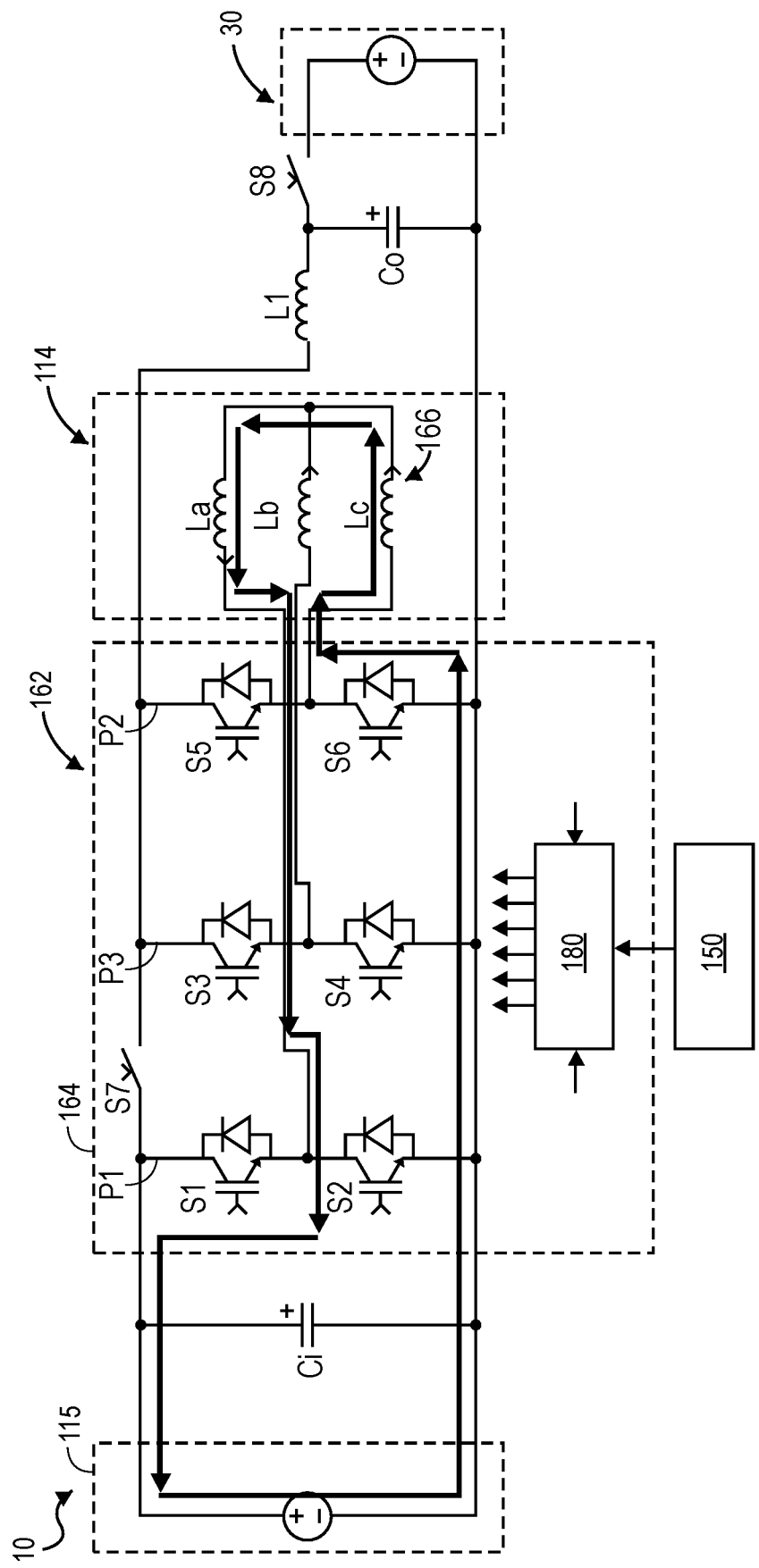
FIG. 4B is a circuit schematic of the system of FIG. 4A, illustrating the power inverter disposed in an external OFF state, where the power inverter electrically disconnects the off-board power source from the electric motor.

Referring now to FIGS. 4A and 4B, the system 10 is disposed in the reverse buck mode where the off-board power source 30 is configured to store the second voltage that is above the first voltage of the RESS 115. The power inverter 162 cycles between the ON state (FIG. 4A) and the external OFF state (FIG. 4B) for stepping down the second voltage from the off-board power source 30 to the first voltage for charging the RESS 115, in response to: the inter-leg switch S7 being moved to the open position; the first and second semiconductor switches S5, S6 of the second phase leg P2 being subjected to a pulse width modulation; the first semiconductor switch S1 of the first phase leg P1 being moved to the closed position; the second semiconductor switch S2 of the first phase leg P1 and the first and second semiconductor switches S3, S4 of the third phase leg P3 being moved to the open position; and the external switch S8 moved to the closed position. Current flows through one or more of the machine windings La, Lc to cause a voltage from the off-board power source 30 to step down from the second voltage to the first voltage. The inductors La, Lc can reduce the voltage from the first voltage to the second voltage such that the machine windings 166 perform a buck conversion. Inductor L1 can be positioned in series with the machine windings 166 to reduce, e.g., mitigate, current ripple and torque disturbance. In this example, the duty cycle of S5 for the pulse width modulation may be approximately the ratio of the voltage of RESS 115 to that of the external source 30.

Referring now to FIGS. 5A and 5B, the system 10 is disposed in the forward boost mode where the RESS 115 is configured to store the first voltage that is above the second voltage of the off-board power source 30. The power inverter 162 cycles between the RESS OFF state (FIG. 5A) and the ON state (FIG. 5B) for stepping up the second voltage from the off-board power source 30 to the first voltage for charging the RESS 115, in response to: the inter-leg switch S7 being moved to the open position; the first and second semiconductor switches S1, S2 of the first phase leg P1 being subjected to a pulse width modulation; the first semiconductor switch S5 of the second phase leg P2 being moved to the closed position; the second semiconductor switch S6 of the second phase leg P2 and the first and second semiconductor switches S3, S4 of the third phase leg P3 being moved to the open position; and the external switch S8 moved to the closed position. Current flows through one or more of the machine windings La, Lc to cause a voltage from the off-board power source 30 to step up from the second voltage to the first voltage. The inductors La, Lc can increase the voltage from the second voltage to the first voltage such that the machine windings 166 perform a boost conversion. Inductor L1 can be positioned in series with the machine windings 166 to reduce, e.g., mitigate, current ripple and torque disturbance.

Referring now to FIGS. 6A and 6B, the system 10 is disposed in the reverse boost mode where the off-board power source 30 is configured to store the second voltage that is above the first voltage of the RESS 115. The power inverter 162 cycles between the external OFF state (FIG. 6A) and the ON state (FIG. 6B) for stepping up the first voltage from the RESS 115 to the second voltage for charging the off-board power source 30, in response to: the inter-leg switch S7 being moved to the open position; the first and second semiconductor switches S5, S6 of the second phase leg P2 being subjected to a pulse width modulation; the first semiconductor switch S2 of the first phase leg P1 being moved to the closed position; the second semiconductor switch S2 of the first phase leg P1 and the first and second semiconductor switches S3, S4 of the third phase leg P3 being moved to the open position; and the external switch S8 moved to the closed position. Current flows through one or more of the machine windings La, Lc to cause a voltage from the RESS 115 to step up from the first voltage to the second voltage. The inductors La, Lc can increase the voltage from the first voltage to the second voltage such that the machine windings 166 perform a boost conversion. Inductor L1 can be positioned in series with the machine windings 166 to reduce, e.g., mitigate, current ripple and torque disturbance.

Another example of a power inverter can be similar to the power inverter 162 of FIGS. 3A-6B and include the same components identified by the same numbers. However, while the power inverter 162 of FIGS. 3A-6B includes the inter-leg switch S7 disposed directly between the first and third phase legs P1, P3 for isolating the first phase leg P1 from the second and third phase legs P2, P3 when the inter-leg switch S7 is moved to the open position, another exemplary power converter can have the inter-leg switch S7 disposed directly between the third and second phase legs P3, P2 for isolating the second phase leg P2 from the first and third phase legs P1, P3 when the inter-leg switch S7 is moved to the open position. In still another example, the power inverter can include two inter-leg switches, with one switch disposed directly between the first and third phase legs P1, P3 and the other switch disposed directly between the third and second phase legs P3, P2. Depending on the phase leg selected to connect to the off-board source 30, the inter-leg switches are selectively opened to enable the desired mode of operation.

Figure 7:
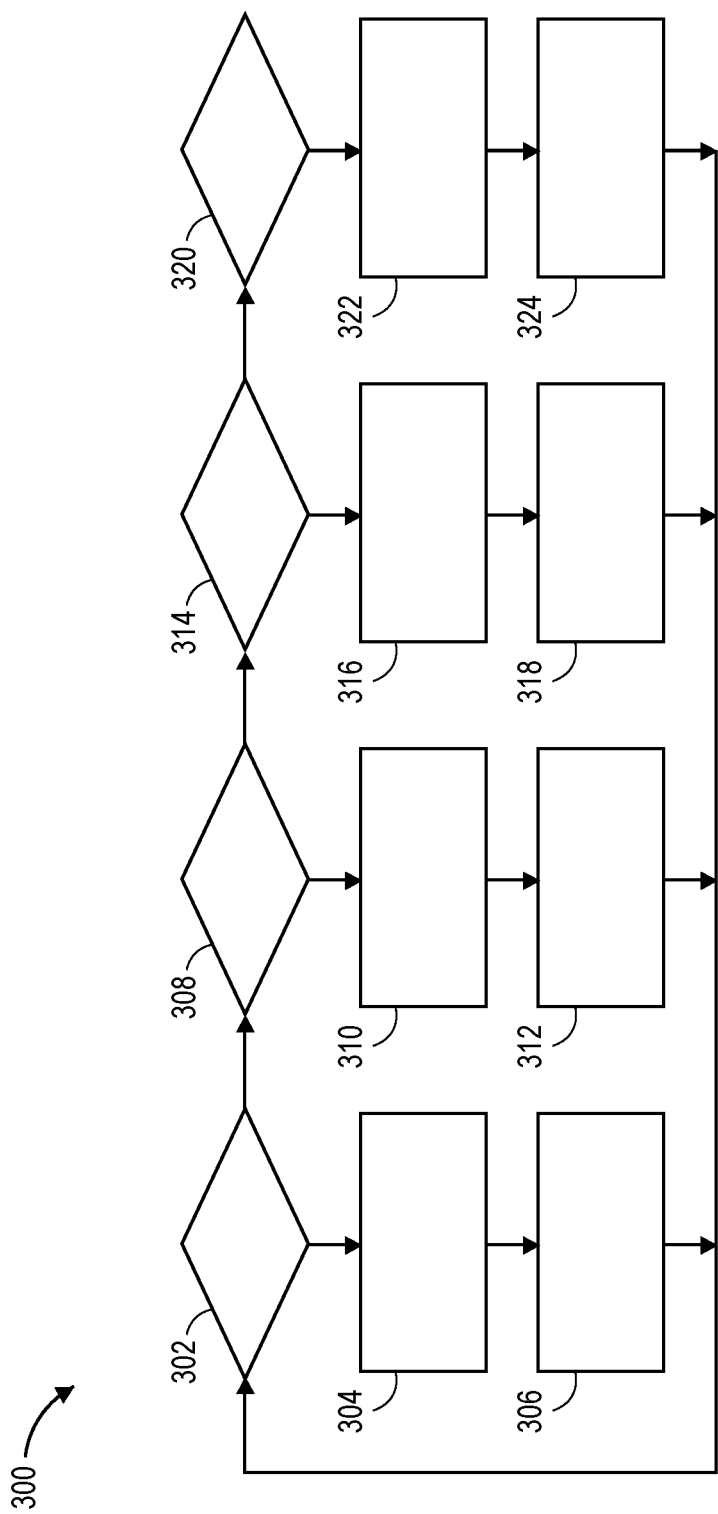
FIG. 7 is a flow chart of one example of a method of operating the system of FIG. 2.

Referring to FIG. 7, one example of a method 300 of operating the system of FIG. 2 is illustrated. As described in detail below, the controller 150 and/or the inverter controller 180 move the power inverter 162 to the ON state, the RESS state, and the external state. The system 10 transitions between the forward buck mode, the reverse buck mode, the forward boost mode, and the reverse boost mode for delivering electrical energy from one of the RESS 115 and the off-board power source 30 to the other of the RESS 115 and the off-board power source 30, in response to the power inverter 162 transitioning between two of the ON state, the RESS state, and the external state, the switch S7 being in the open position, and the switch S8 being in the closed position.

The method 300 begins at block 302 with the controller 150 determining whether a selection of the forward buck mode (FIGS. 3A and 3B) has been received. The controller 150 determines the selection of the forward buck mode where the first voltage of the RESS 115 is above the second voltage of the off-board power source 30, and the RESS 115 is available to charge the off-board power source 30. If the controller 150 determines that the selection of the forward buck mode has been received, the method 300 proceeds to block 304. If the controller 150 determines that the selection of the forward buck mode has not been received, the method 300 proceeds to block 308.

At block 304, first, the inter-leg switch S7 is moved to the open position. The first semiconductor switch S5 of the second phase leg P2 is moved to the closed position. The second semiconductor switch S6 of the second phase leg P2 and the first and second semiconductor switches S3, S4 of the third phase leg P3 are moved to the open position. Then, the controller 150 generates a plurality of control signals associated with the forward buck mode, in response to the controller 150 determining the selection of the forward buck mode.

At block 306, the inverter controller 180 generates a plurality of switch signals, in response to the inverter controller 180 receiving the control signals from the controller 150. The power inverter 162 cycles between the ON state and the RESS OFF state, such that current flows through at least one of the machine windings 166 for stepping down the first voltage from the RESS 115 to the second voltage for charging the off-board power source 30, in response to the first and second semiconductor switches S1-S6 receiving the switch signals from the inverter controller 180. More specifically, cycling the power inverter 162 between the ON state and the RESS OFF state includes subjecting the first and second semiconductor switches S1, S2 of the first phase leg P1 to a pulse width modulation, where the first phase leg P1 includes a positive terminal connected to a positive terminal of the RESS 115 and the second phase leg P2 includes a positive terminal connected to a positive terminal of the off-board power source 30. The system 10 in the forward buck mode delivers a stepped down voltage from the RESS 115 to the off-board power source 30.

At block 308, the controller 150 determines whether the selection of the reverse buck mode (FIGS. 4A and 4B) has been made, where the second voltage of the off-board power source 30 is above the first voltage of the RESS 115, and the off-board power source 30 is available to charge the RESS 115. If the controller 150 determines that the selection of the reverse buck mode has been received, the method 300 proceeds to block 314. If the controller 150 determines that the selection of the reverse buck mode has not been received, the method 300 proceeds to block 310.

At block 310, first, the inter-leg switch S7 is moved to the open position. The first semiconductor switch S1 of the first phase leg P1 is moved to the closed position. The second semiconductor switch S2 of the first phase leg P1 and the first and second semiconductor switches S3, S4 of the third phase leg P3 are moved to the open position. Then, the controller 150 generates a plurality of control signals associated with the reverse buck mode, in response to the controller 150 determining the selection of the reverse buck mode.

At block 312, the inverter controller 180 generates a plurality of switch signals, in response to the inverter controller 180 receiving the control signals from the controller 150. The power inverter 162 cycles between the ON state and the external OFF state, such that current flows through at least one of the machine windings 166 for stepping down the second voltage from the off-board power source 30 to the first voltage for charging the RESS 115, in response to the first and second semiconductor switches S1-S6 receiving the switch signals from the inverter controller 180. More specifically, cycling the power inverter 162 between the ON state and the external OFF state includes subjecting the first and second semiconductor switches S5, S6 of the second phase leg P2 to a pulse width modulation, where the second phase leg P2 includes a positive terminal connected to a positive terminal of the off-board power source 30. The system 10 in the reverse buck mode delivers a stepped down voltage from the off-board power source 30 to the RESS 115.

At block 314, the controller 150 determines whether the selection of the forward boost mode (FIGS. 5A and 5B) has been made, where the first voltage of the RESS 115 is above the second voltage of the off-board power source 30, and the off-board power source 30 is available to charge the RESS 115. If the controller 150 determines that the selection of the forward boost mode has been received, the method 300 proceeds to block 316. If the controller 150 determines that the selection of the forward boost mode has not been received, the method 300 proceeds to block 320.

At block 316, the controller 150 generates a plurality of control signals associated with the forward boost mode, in response to the controller 150 determining the selection of the forward boost mode.

At block 318, first the inter-leg switch S7 is moved to the open position. The first semiconductor switch S5 of the second phase leg P2 is moved to the closed position. The second semiconductor switch S6 of the second phase leg P2 and the first and second semiconductor switches S3, S4 of the third phase leg P3 are moved to the open position. Then, the inverter controller 180 generates a plurality of switch signals, in response to the inverter controller 180 receiving the control signals from the controller 150. The power inverter 162 cycles between the RESS OFF state and the ON state, such that current flows through at least one of the machine windings 166 for stepping up the second voltage from the off-board power source 30 to the first voltage for charging the RESS 115, in response to the first and second semiconductor switches S1-S6 receiving the switch signals from the inverter controller 180. More specifically, cycling the power inverter 162 between the RESS OFF state and the ON state includes subjecting the first and second semiconductor switches S1, S2 of the first phase leg P1 to a pulse width modulation. The system 10 in the forward boost mode delivers a stepped up voltage from the off-board power source 30 to the RESS 115.

At block 320, the controller 150 determines whether the selection of the reverse boost mode (FIGS. 6A and 6B) has been made, where the second voltage of the off-board power source 30 is above the first voltage of the RESS 115, and the RESS 115 is available to charge the off-board power source 30. If the controller 150 determines that the selection of the reverse boost mode has been received, the method 300 proceeds to block 322. If the controller 150 determines that the selection of the forward buck mode has not been received, the method 300 returns to block 302.

At block 322, the controller 150 generates a plurality of control signals associated with the reverse boost mode, in response to the controller determining the selection of the reverse boost mode.

At block 324, the inter-leg switch S7 is moved to the open position. The first semiconductor switch S1 of the first phase leg P1 is moved to the closed position. The second semiconductor switch S2 of the first phase leg P2 and the first and second semiconductor switches S3, S4 of the third phase leg P3 are moved to the open position. Then, the inverter controller 180 generates a plurality of switch signals, in response to the inverter controller 180 receiving the control signals from the controller 150. The power inverter 162 cycles between the external OFF state and the ON state, such that current flows through at least one of the machine windings 166 for stepping up the first voltage from the RESS 115 to the second voltage for charging the off-board power source 30, in response to the first and second semiconductor switches S1-S6 receiving the switch signals from the inverter controller 180. More specifically, cycling the power inverter 162 between the external OFF state and the ON state includes subjecting the first and second semiconductor switches S5, S6 of the second phase leg P2 to a pulse width modulation. The system 10 in the reverse boost mode delivers a stepped up voltage from the RESS 115 to the off-board power source 30.

In some implementations, software for the controller 150 may be updated based via over-the-air programming. For example, software updates can be transmitted to the controller 150 via one or more suitable communication networks from a data source, such as an original equipment manufacturer (OEM). The over-the-air updates can provide desired parameters to adjust charging power by adjusting the inverter control signals, e.g., current command, frequency, duty cycle, phase shift, etc., for one or more switches S1 to S6 according to a charging power level via the inverter controller 180.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A bi-directional electrical charging system for a motor vehicle, comprising:
a rechargeable energy storage system (RESS) configured to store a first voltage, and the RESS is adapted for use with an off-board power source that is configured to store a second voltage;
an electric motor having a plurality of machine windings; and
a power inverter disposed between the RESS and the off-board power source, the power inverter is movable to an ON state where the power inverter connects the RESS and the off-board power source to at least one of the machine windings, a RESS OFF state where the power inverter disconnects the RESS from each of the machine windings and connects the off-board power source to at least one of the machine windings, and an external OFF state where the power inverter connects the RESS to at least one of the machine windings and disconnects the off-board power source from each of the machine windings;
wherein the system is movable to a forward buck mode, a reverse buck mode, a forward boost mode, and a reverse boost mode for selectively delivering electrical power from one of the RESS and the off-board power source to the other of the RESS and the off-board power source, in response to the power inverter cycling between at least two of the ON state, the RESS OFF state, and the external OFF state.

2. The bi-directional electrical charging system of claim 1, wherein the power inverter comprises:
a plurality of phase legs, with each of the phase legs connected to a corresponding one of the machine windings of the electric motor, and each of the phase legs comprises first and second semiconductor switches movable between open and closed positions; and
an inter-leg switch separate from the first and second semiconductor switches and movable between open and closed positions, with the inter-leg switch disposed between two of the phase legs for isolating the phase legs from one another when the inter-leg switch is moved to the open position.

3. The bi-directional electrical charging system of claim 2, wherein the plurality of phase legs comprises first and second phase legs;
wherein the first phase leg includes a positive terminal connected to a positive terminal of the RESS, and the second phase leg includes a positive terminal connected to a positive terminal of the off-board power source.

4. The bi-directional electrical charging system of claim 3, wherein the system is disposed in the forward buck mode and the power inverter cycles between the ON state and the RESS OFF state for stepping down the first voltage from the RESS to the second voltage for charging the off-board power source in response to the inter-leg switch being moved to the open position, the first and second semiconductor switches of the first phase leg being subjected to a pulse width modulation, the first semiconductor switch of the second phase leg being moved to the closed position, and the second semiconductor switch of the second phase leg being moved to the open position.

5. The bi-directional electrical charging system of claim 4, wherein the system is disposed in the reverse buck mode and the power inverter cycles between the ON state and the external OFF state for stepping down the second voltage from the off-board power source to the first voltage for charging the RESS in response to the inter-leg switch being moved to the open position, the first and second semiconductor switches of the second phase leg being subjected to a pulse width modulation, the first semiconductor switch of the first phase leg being moved to the closed position, and the second semiconductor switch of the first phase leg being moved to the open position.

6. The bi-directional electrical charging system of claim 5, wherein the system is disposed in the forward boost mode and the power inverter cycles between the RESS OFF state and the ON state for stepping up the second voltage from the off-board power source to the first voltage for charging the RESS in response to the inter-leg switch being moved to the open position, the first semiconductor switch of the second phase leg being moved to the closed position, the first and second semiconductor switches of the first phase leg being subjected to a pulse width modulation, and the second semiconductor switch of the second phase leg being moved to the open position.

7. The bi-directional electrical charging system of claim 6, wherein the system is disposed in the reverse boost mode and the power inverter cycles between the external OFF state and the ON state for stepping up the first voltage from the RESS to the second voltage for charging the off-board power source in response to the inter-leg switch being moved to the open position, the first semiconductor switch of the first phase leg being moved to the closed position, the first and second semiconductor switches of the second phase leg being subjected to a pulse width modulation, and the second semiconductor switch of the first phase leg being moved to the open position.

8. The bi-directional electrical charging system of claim 7, further comprising:
an external switch disposed between the power inverter and the off-board power source, and the external switch is movable between a closed position where the off-board power source is connected to the power inverter and an open position where the off-board power source is disconnected from each of the machine windings; and
an inductor connected in series between the plurality of machine windings and the off-board power source, wherein the inductor is configured to mitigate at least one of current ripple or torque ripple.

9. A bi-directional electrical charging system for a motor vehicle, comprising:

a rechargeable energy storage system (RESS) configured to store a first voltage, and the RESS is adapted for use with an off-board power source that is configured to store a second voltage;
an electric motor having a plurality of machine windings; and
a power inverter disposed between the RESS and the off-board power source, the power inverter is movable to an ON state where the power inverter connects the RESS and the off-board power source to at least one of the machine windings, a RESS OFF state where the power inverter disconnects the RESS from each of the machine windings and connects the off-board power source to at least one of the machine windings, and an external OFF state where the power inverter connects the RESS to at least one of the machine windings and disconnects the off-board power source from each of the machine windings;
a controller connected to the power inverter, wherein the controller is configured to generate a plurality of control signals, and the power inverter cycles between at least two of the ON state, the RESS OFF state, and the external OFF state in response to the power inverter receiving the control signals from the controller;
wherein the system is movable to a forward buck mode, a reverse buck mode, a forward boost mode, and a reverse boost mode for selectively delivering electrical power from one of the RESS and the off-board power source to the other of the RESS and the off-board power source, in response to the power inverter cycling between at least two of the ON state, the RESS OFF state, and the external OFF state.

10. The bi-directional electrical charging system of claim 9, wherein the power inverter comprises:
an inverter controller for generating a plurality of switch signals in response to the inverter controller receiving the control signals from the controller;
first and second phase legs, with each of the first and second phase legs connected to a corresponding one of the machine windings of the electric motor, and each of the first and second phase legs comprising first and second semiconductor switches movable between open and closed positions in response to the first and second semiconductor switches receiving the switch signals from the inverter controller; and
an inter-leg switch separate from the first and second semiconductor switches and movable between open and closed positions, with the inter-leg switch disposed between the first and second phase legs for isolating the first and second phase legs from one another when the inter-leg switch is moved to the open position;
wherein the first phase leg includes a positive terminal connected to a positive terminal of the RESS, and the second phase leg includes a positive terminal connected to a positive terminal of the off-board power source.

11. The bi-directional electrical charging system of claim 10, wherein the system is disposed in the forward buck mode and the power inverter cycles between the ON state and the RESS OFF state for stepping down the first voltage from the RESS to the second voltage for charging the off-board power source in response to the inter-leg switch being moved to the open position, the first and second semiconductor switches of the first phase leg being subjected to a pulse width modulation, the first semiconductor switch of the second phase leg being moved to the closed position, and the second semiconductor switch of the second phase leg being moved to the open position.

12. The bi-directional electrical charging system of claim 11, wherein the system is disposed in the reverse buck mode and the power inverter cycles between the ON state and the external OFF state for stepping down the second voltage from the off-board power source to the first voltage for charging the RESS in response to the inter-leg switch being moved to the open position, the first and second semiconductor switches of the second phase leg being subjected to a pulse width modulation, the first semiconductor switch of the first phase leg being moved to the closed position, and the second semiconductor switch of the first phase leg being moved to the open position.

13. The bi-directional electrical charging system of claim 12, wherein the system is disposed in the forward boost mode and the power inverter cycles between the RESS OFF state and the ON state for stepping up the second voltage from the off-board power source to the first voltage for charging the RESS in response to the inter-leg switch being moved to the open position, the first semiconductor switch of the second phase leg being moved to the closed position, the first and second semiconductor switches of the first phase leg being subjected to a pulse width modulation, and the second semiconductor switch of the second phase leg being moved to the open position.

14. The bi-directional electrical charging system of claim 13, wherein the system is disposed in the reverse boost mode and the power inverter cycles between the external OFF state and the ON state for stepping up the first voltage from the RESS to the second voltage for charging the off-board power source in response to the inter-leg switch being moved to the open position, the first semiconductor switch of the first phase leg being moved to the closed position, the first and second semiconductor switches of the second phase leg being subjected to a pulse width modulation, and the second semiconductor switch of the first phase leg being moved to the open position.

15. A method of operating a bi-directional electrical charging system for a motor vehicle having a rechargeable energy storage system (RESS) for storing a first voltage and adapted for use with an off-board power source for storing a second voltage, the system further having an electric motor having a plurality of machine windings, a power inverter having first and second phase legs with each of the first and second phase legs having first and second semiconductor switches, an inter-leg switch disposed between the first and second phase legs, and a controller, the method comprising:
  determining, using the controller, a selection of one a forward buck mode, a reverse boost mode, a forward boost mode, and a reverse buck mode has been received;
  generating, using the controller, a plurality of control signals in response to the selection of one the forward buck mode, the reverse boost mode, the forward boost mode, and the reverse buck mode;
  generating, using an inverter controller, a plurality of switch signals in response to the inverter controller receiving the control signals from the controller;
  cycling, using the first and second semiconductor switches in response to the switch signals from the inverter controller, the power inverter between at least two of:
    an ON state where the power inverter connects the RESS and the off-board power source to at least one of the machine windings;
    a RESS OFF state where the power inverter disconnects the RESS from each of the machine windings and connects the off-board power source to at least one of the machine windings; and
    an external OFF state where the power inverter connects the RESS to at least one of the machine windings and disconnects the off-board power source from each of the machine windings;
  moving the inter-leg switch to an open position in response to the inter-leg switch receiving one of the switch signals from the inverter controller;
  moving the system between the forward buck mode, the reverse buck mode, the forward boost mode, and the reverse boost mode for selectively delivering one of a stepped up voltage and a stepped down voltage from one of the RESS and the off-board power source to the other of the RESS and the off-board power source, in response to the power inverter cycling between at least two of the ON state, the RESS state, and the external OFF state.

16. The method of claim 15, further comprising:
  determining, using the controller, the selection of the forward buck mode where the first voltage of the RESS is above the second voltage of the off-board power source; and
  cycling the power inverter between the ON state and the RESS OFF state, such that current flows through at least one of the machine windings for stepping down the first voltage from the RESS to the second voltage for charging the off-board power source;
  wherein cycling the power inverter between the ON state and the RESS OFF state comprises:
    moving the inter-leg switch to the open position;
    subjecting the first and second semiconductor switches of the first phase leg to a pulse width modulation, where the first phase leg includes a positive terminal connected to a positive terminal of the RESS;
    moving the first semiconductor switch of the second phase leg to the closed position; and
    moving the second semiconductor switch of the second phase leg to the open position.

17. The method of claim 15, further comprising:
  determining, using the controller, the selection of the reverse buck mode where the second voltage of the off-board power source is above the first voltage of the RESS; and
  cycling the power inverter between the ON state and the external OFF state, such that current flows through at least one of the machine windings to step down the second voltage from the off-board power source to the first voltage for charging the RESS;
  wherein cycling the power inverter between the ON state and the external OFF state comprises:
    moving the inter-leg switch to the open position;
    subjecting the first and second semiconductor switches of the second phase leg to the pulse width modulation, where the second phase leg includes a positive terminal connected to a positive terminal of the off-board power source;
    moving the first semiconductor switch of the first phase leg to the closed position; and
    moving the second semiconductor switch of the first phase leg to the open position.

18. The method of claim 17, further comprising:
  determining, using the controller, the selection of the forward boost mode where the first voltage of the RESS is above the second voltage of the off-board power source; and cycling the power inverter between the RESS OFF state and the ON state, such that current flows through at least one of the machine windings for stepping up the second voltage from the off-board power source to the first voltage for charging the RESS;

wherein cycling the power inverter between the RESS OFF state and the ON state comprises:
   moving the inter-leg switch to the open position;
   moving the first semiconductor switch of the second phase leg to the closed position;
   subjecting the first and second semiconductor switches of the first phase leg to the pulse width modulation; and
   moving the second semiconductor switch of the second phase leg to the open position.

19. The method of claim 18, further comprising:
determining, using the controller, the selection of the reverse boost mode where the second voltage of the off-board power source is above the first voltage of the RESS; and cycling the power inverter between the external OFF state and the ON state, such that current flows through at least one of the machine windings for stepping up the first voltage from the RESS to the second voltage for charging the off-board power source;

wherein cycling the power inverter between the external OFF state and the ON state comprises:
   moving the inter-leg switch to the open position;
   moving the first semiconductor switch of the first phase leg to the closed position;
   subjecting the first and second semiconductor switches of the second phase leg to the width modulation; and
   moving the second semiconductor switch of the first phase leg to the open position.

20. The method of claim 15, further comprising receiving, using the controller, a software update via an over-the-air programming, with the software update being associated with the control signals generated by the controller.

\* \* \* \* \*